(12) United States Patent
Ullman

(10) Patent No.: US 8,540,038 B1
(45) Date of Patent: Sep. 24, 2013

(54) LOW PROFILE OMNIDIRECTIONAL VEHICLE

(75) Inventor: Stuart G. Ullman, Kensington, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 760 days.

(21) Appl. No.: 12/319,917

(22) Filed: Jan. 9, 2009

(51) Int. Cl.
B62D 55/06 (2006.01)

(52) U.S. Cl.
USPC .............................. 180/9.1; 305/52

(58) Field of Classification Search
USPC ........... 301/5.23; 180/9.1, 9.21, 6.7; 305/52; 280/28.5
See application file for complete search history.

(56) References Cited

U.S. PATENT DOCUMENTS

| | | | | |
|---|---|---|---|---|
| 2,389,624 A * | 11/1945 | Knox et al. | | 180/9.62 |
| 3,154,045 A * | 10/1964 | Fisher | | 440/12.63 |
| 3,200,770 A * | 8/1965 | Hendry | | 105/163.1 |
| 3,554,300 A * | 1/1971 | Rosenberg | | 175/5 |
| 3,591,241 A * | 7/1971 | Allen | | 305/8 |
| 3,768,630 A | 10/1973 | Inwood et al. | | |
| 3,789,947 A | 2/1974 | Blumrich | | |
| 3,876,255 A | 4/1975 | Ilon | | |
| 3,948,572 A * | 4/1976 | Korner et al. | | 305/195 |
| 4,588,073 A | 5/1986 | Abell | | |
| 4,671,774 A * | 6/1987 | Owsen | | 440/95 |
| 5,186,270 A | 2/1993 | West | | |
| 5,323,867 A | 6/1994 | Griffin et al. | | |
| 5,551,349 A * | 9/1996 | Bodzin | | 104/138.2 |
| 5,752,574 A * | 5/1998 | Oertley | | 180/9.5 |
| 6,179,073 B1 * | 1/2001 | Chhabra et al. | | 180/9.1 |
| 6,186,724 B1 | 2/2001 | Hollander | | |
| 6,340,065 B1 | 1/2002 | Harris | | |
| 6,527,072 B1 * | 3/2003 | Schlegl et al. | | 180/9.1 |
| 6,890,042 B2 * | 5/2005 | Inaoka et al. | | 305/173 |
| 7,293,790 B2 * | 11/2007 | Byun et al. | | 280/262 |
| 7,641,288 B1 * | 1/2010 | Baker et al. | | 301/5.23 |
| 7,976,064 B2 * | 7/2011 | Abdulaev | | 280/755 |
| 7,980,336 B2 * | 7/2011 | Takenaka et al. | | 180/7.1 |
| 2003/0067209 A1 * | 4/2003 | Marrero | | 301/5.23 |
| 2005/0056468 A1 * | 3/2005 | Tucker | | 180/9.1 |
| 2007/0267278 A1 * | 11/2007 | Reist | | 198/852 |
| 2010/0270850 A1 * | 10/2010 | Brudniok | | 301/5.23 |
| 2011/0231013 A1 * | 9/2011 | Smoot et al. | | 700/245 |

* cited by examiner

*Primary Examiner* — Anne Marie Boehler
*Assistant Examiner* — Maurice Williams
(74) *Attorney, Agent, or Firm* — Dave A. Ghatt

(57) ABSTRACT

A track assembly and vehicle for omnidirectional travel. The track assembly includes a driving arrangement and two or more closed loop linking members connected to the driving arrangement. The track assembly also includes freely rotatable rollers for contacting a surface, the rollers supported on the closed loop linking members. The rollers travel a roller path defined by the motion of the closed loop linking members. An omnidirectional vehicle includes two or more track assemblies.

15 Claims, 4 Drawing Sheets

LOW PROFILE OMNIDIRECTIONAL VEHICLE

STATEMENT OF GOVERNMENT INTEREST

The following description was made in the performance of official duties by employees of the Department of the Navy, and, thus the claimed invention may be manufactured, used, licensed by or for the United States Government for governmental purposes without the payment of any royalties thereon.

TECHNICAL FIELD

The following description relates generally to an omnidirectional vehicle, and in particular, a vehicle having a plurality of track assemblies that provide omnidirectional maneuverability, each track assembly having freely rotatable rollers angled between offset closed loop linking members.

BACKGROUND

Wheel and track arrangements in vehicles have been developed and improved to increase the dexterity of these vehicles. In industrial applications for example, such as forklifts and tractors, the maneuverability of vehicles can be improved by the provision of omnidirectional wheels. One such wheel design is the Mecanum Wheel, which has been used in forklifts, wheelchairs, and other applications.

FIG. 1 is a prior art illustration shown a Mecanum Wheel 10. As shown, the wheel 10 includes oval football-shaped rollers 12, angled on a wheel frame 14. Because of the shape of the rollers, only a point contact on the outer circumference of each roller contacts a given surface when in operation. This results in a reduced ability to navigate cracks and ridges in a given surface. Additionally, cracks and ridges produce additional wear on the rollers 12. Additionally, because of the shape of the Mecanum wheel, vehicles employing this wheel have a raised profile. The prior art does not teach a low profile compact omnidirectional vehicle with optimized maneuverability.

SUMMARY

In one aspect, the invention is a track assembly for providing omnidirectional maneuverability in a vehicle along a substantially planar surface. The track assembly includes a driving arrangement and a first closed loop linking member connected to the driving arrangement. The driving arrangement drives the first closed loop linking member in a first looped path. The track assembly also includes a second closed loop linking member connected to the driving arrangement, with the driving arrangement driving the second closed loop linking member in a second looped path. The first looped path and the second looped path are substantially identical and substantially parallel. Additionally, each of the first closed loop linking member and the second closed loop linking member travel the respective first and second looped paths at substantially identical velocities. The invention also includes a roller arrangement. The roller arrangement includes a plurality of rollers for contacting the substantially planar surface and a plurality of roller axles, with each roller axle comprising a first end and a second end. Each roller axle rotatably supports one of the plurality of rollers, each roller being freely rotatable. Each first end of each roller axle is connected to the first closed loop linking member, and each second end of each roller axle is connected to the second closed loop linking member. Each roller is supported substantially parallel to the substantially planar surface between the first closed loop linking member and the second closed loop linking member. Each roller translates a looped roller path via the motion of the first closed loop linking member and the second closed loop linking member. The plurality of rollers is supported on the plurality of axles so that each roller maintains an orientation substantially identical to an orientation of every other roller along the looped roller path.

In another aspect, the invention is a vehicle for omnidirectional travel on a substantially planar surface. The vehicle includes a main vehicle chassis having a plurality of track attachment locations. In this aspect, the invention includes two or more track assemblies, with each of the two or more track assemblies attached to one of the plurality of track attachment locations. Each track assembly includes a driving arrangement, and a first closed loop linking member connected to the driving arrangement. The driving arrangement drives the first closed loop linking member in a first looped path. The track assembly also includes a second closed loop linking member connected to the driving arrangement, with the driving arrangement driving the second closed loop linking member in a second looped path. The first looped path and the second looped path are substantially identical and substantially parallel. Each of the first closed loop linking member and the second closed loop linking member travel the respective first and second looped paths at substantially identical velocities. The track assembly also includes a roller arrangement having a plurality of rollers for contacting the substantially planar surface. A plurality of roller axles is also provided, each roller axle comprising a first end and a second end, wherein each roller axle rotatably supports one of the plurality of rollers. Each roller is freely rotatable, and each first end of each roller axle is connected to the first closed loop linking member, and each second end of each roller axle is connected to the second closed loop linking member, so each roller is supported substantially parallel to the substantially planar surface between the first closed loop linking member and the second closed loop linking member. In this aspect, each roller translates a looped roller path via the motion of the first closed loop linking member and the second closed loop linking member. The plurality of rollers is supported on the plurality of axles so that each roller maintains an orientation substantially identical to an orientation of every other roller along the looped roller path.

In yet another aspect, the invention is a vehicle for omnidirectional travel on a substantially planar surface. The vehicle has a main vehicle chassis including a plurality of track attachment locations. The vehicle includes two or more track assemblies, each of the two or more track assemblies is attached to one of the plurality of track attachment locations. Each track assembly includes a driving arrangement having two or more closed loop linking members connected to the driving arrangement, the driving arrangement driving each closed loop linking member in a looped path, wherein each looped path is substantially identical and substantially parallel to the other. Each closed loop linking member travels the respective closed loop path at substantially identical velocities. Each track assembly includes one or more roller arrangements, each of the one or more roller arrangements having a plurality of rollers for contacting the substantially planar surface and a plurality of roller axles. Each roller axle has a first end and a second end, wherein each roller axle rotatably supports one of the plurality of rollers. Each first end of each roller axle is connected to a closed loop linking member and each second end of each roller axle is connected to another closed loop linking member so each roller translates a looped roller path via the motion of the closed loop linking members to which the first and second axle ends are attached. The plurality of rollers is supported on the plurality of axles so that each roller maintains an orientation substantially identical to an orientation of every other roller along the looped roller path.

BRIEF DESCRIPTION OF THE DRAWINGS

Other features will be apparent from the description, the drawings, and the claims.

DETAILED DESCRIPTION

Figure 1A:
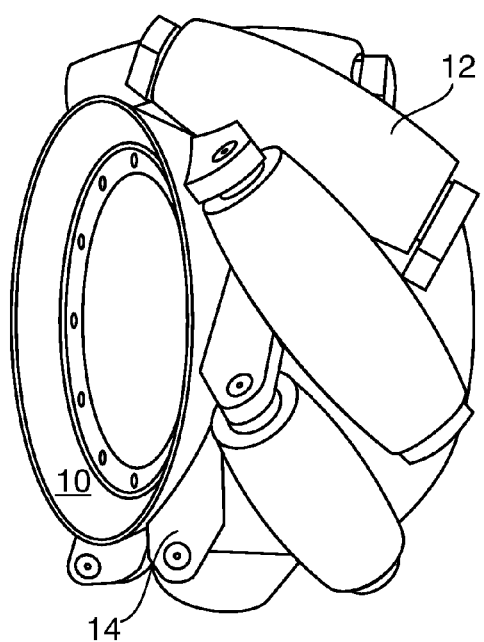
FIG. 1A is a prior art illustration of a wheel arrangement for an omnidirectional vehicle.
Figure 1B:
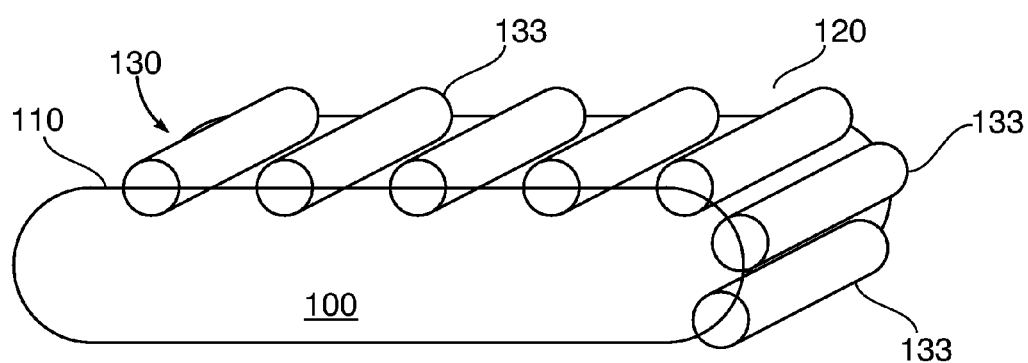
FIG. 1B is a schematic illustration of a track assembly for providing omnidirectional maneuverability according to an embodiment of the invention.

FIG. 1B is a schematic illustration of a track assembly 100 for providing ominidirectional maneuverability to a vehicle. As will be outlined below, two or more track assemblies 100 may be attached to a vehicle to provide a compact low profile arrangement that allows the vehicle to travel in any desired direction. The track assembly 100 as schematically shown includes a first closed loop linking member 110 and a second closed loop linking member 120, and a roller arrangement 130 including a plurality of freely rotatable cylindrical rollers 133. Each of the plurality of rollers 133 is connected at extreme ends to the first and second closed loop linking members 110 and 120. FIG. 1B shows the first and second closed loop linking members 110 and 120 being substantially identical, as well as substantially parallel.

Figure 2A:
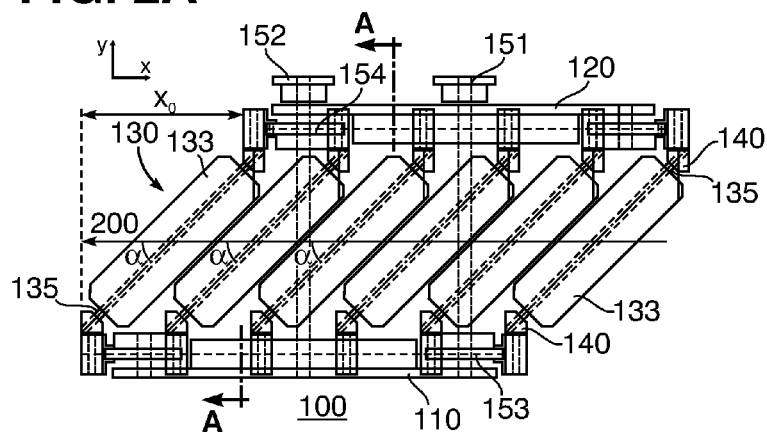
FIG. 2A is a top view of a track assembly for providing omnidirectional maneuverability, according to an embodiment of the invention.

FIG. 2A, is a top view of a track assembly 100 for providing omnidirectional maneuverability in a vehicle, according to an embodiment of the invention. As shown, the track assembly 100 includes a first closed loop linking member 110, and a second closed loop linking member 120. The first and second closed loop linking members may be chains, tracks, or the like. FIG. 2A also shows the roller arrangement 130, which includes the plurality of parallel cylindrical rollers 133 mounted on roller axles 135. The roller axles 135 may each extend into first and second end joints 140 which secure the rollers 133 to the first and second closed loop linking members 110 and 120. The first and second end joints 140 may be any known joint, such as for example, ball and socket joints. As stated above, the rollers 133 are freely rotatable. Each roller 133 may be rotatable by means of providing a bearing arrangement between each roller 133 and each corresponding axle 135. Alternatively, a bearing arrangement between the axles 135 and end joints 140 may also provide for the free rotation of the cylinders 133.

The top view of FIG. 2A shows the first and second closed loop linking members 110 and 120 being substantially parallel to each other. FIG. 2A also shows the first and second closed loop linking members being offset from each other along the X axis, by an offset distance $X_0$. Because the closed loop linking members 110 and 120 are offset from each other, and because the rollers 133 are attached to a corresponding linking member at similar locations along the linking members, the rollers 133 extend in an angled orientation with respect to the linking members.

The angled orientation is defined by a track assembly main axis direction 200, which is parallel to the first and second closed loop linking members 110 and 120. As shown, the axle 135 of each roller 133 forms an angle $\alpha$ with the main axis direction 200. According to an embodiment of the invention, angle $\alpha$ may be any angle between 0 degrees and 90 degrees, but may preferably be an angle of about 60 degrees to about 30 degrees. In one embodiment, angle $\alpha$ is about 45 degrees.

FIG. 2A also shows a driving arrangement including driving members 151 and 152 for driving the first and second closed loop linking members 110 and 120, respectively. Driving members 151 and 152 may be sprockets having toothed gears 153 and 154 respectively that mesh with and drive the linking members 110 and 120. As stated above, the closed loop linking members may be chains or tracks, or the like. As will be outlined below, the driving arrangement drives the first and second closed loop linking members 110 and 120 at substantially identical velocities so that each of the plurality of rollers 133 maintain a substantially similar orientation while the linking members are being driven. Although FIG. 2A shows one driving member driving each closed loop linking member, the driving arrangement may include a plurality of driving members drivingly attached at different locations along the driving path of each closed loop linking member.

Figure 2B:
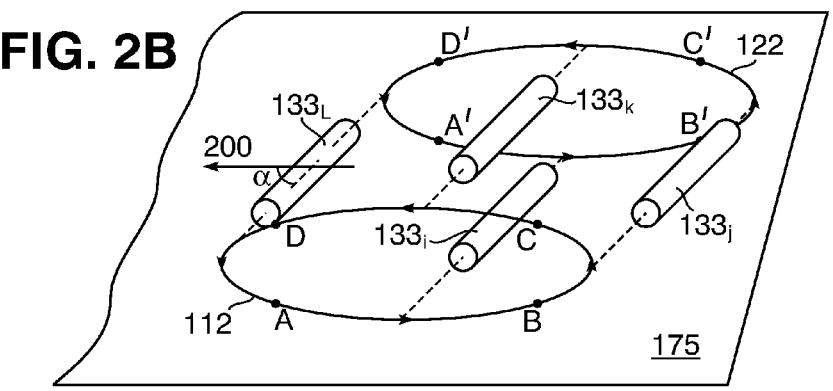
FIG. 2B is a schematic explanatory view illustrating features of a track assembly for providing omnidirectional maneuverability, according to an embodiment of the invention.

FIG. 2B is a schematic explanatory view illustrating features of a track assembly 100, according to an embodiment of the invention. FIG. 2B shows a first closed loop path 112 and a second closed loop path 122 representing the paths covered by the first and second closed loop linking members 110 and 120 respectively, as the linking members are driven by the driving arrangement. As illustrated, the first closed loop path 112 includes a lower elongated path AB, and an upper elongated path CD. Closed loop path 112 also includes a first end path DA and a second end path BC. FIG. 2B also shows the second closed loop path 122 having a lower elongated path A'B' and an upper elongated path CD'. Closed loop path 122 also includes a first end path D'A' and a second end path B'C'. It should be noted that in each closed loop path, the length of the upper path may be different from the length of the lower path. Alternatively, the lengths of the upper and lower paths may be identical. Thus, for example, in closed looped path 112, AB may be equal to CD, or AB and CD may have different lengths. Similarly, in each closed loop path, the length of the end paths may be identical or may be different.

As stated above, paths 112 and 122 are substantially parallel and substantially identical. Therefore lower elongated path AB of 112 corresponds to A'B' of 122. Similarly, paths BC, CD, and DA of 112 correspond to B'C', C'D', and D'A' respectively, of path 122. FIG. 2B shows a single freely rotatable roller 133 in several roller positions roller $133_i$, $133_j$, $133_k$, and $133_l$. As shown in FIG. 2A, each roller 133 is supported at extreme ends at closed looped linking members 110 and 120. Thus, in the illustration of FIG. 2B, the roller 133 translates a roller path dictated by paths 112 and 122. As stated above, because both closed loop paths 112 and 122 travel at substantially identical velocities, the roller 133 maintains its orientation as it traverses its entire roller path. FIG.

2B shows the roller 133 at various locations $133_i$, $133_j$, $133_k$, and $133_l$ along its roller path, at each location maintaining its orientation throughout, i.e., an angle α between the roller axis 135 and the main axis direction 200. As shown, the main axis direction 200 is substantially parallel to the direction of elongation of each closed loop linking member. As stated above, according to an embodiment of the invention, angle α may be any angle between 0 degrees and 90 degrees, but may preferably be an angle of about 60 degrees to about 30 degrees. In one embodiment, angle α is about 45 degrees.

FIG. 2B further illustrates a substantially planar surface 175. In position $133_i$ along the roller path which corresponds to the AB and A'B' portions of the closed loop paths 112 and 122, the roller 133 contacts the substantially planar surface 175. It should be noted that in each location along the roller path, roller is supported substantially parallel to the substantially planar surface 175. Thus, the roller axles 135 supported between the first and second closed loop linking members, shown in FIG. 2A, are also substantially parallel to the substantially planar surface 175. Although only one roller 133 is shown contacting the surface 175, depending on the design of the track assembly, one, two, or more of the freely rotatable rollers 133 may simultaneously contact the surface. Additionally, because of the cylindrical shape of the rollers, from axle-to-axle (end-to-end), the outer circumference of each roller contacts the substantially planar surface as each roller translates and rotates along the respective lower elongated path.

Figure 2C:
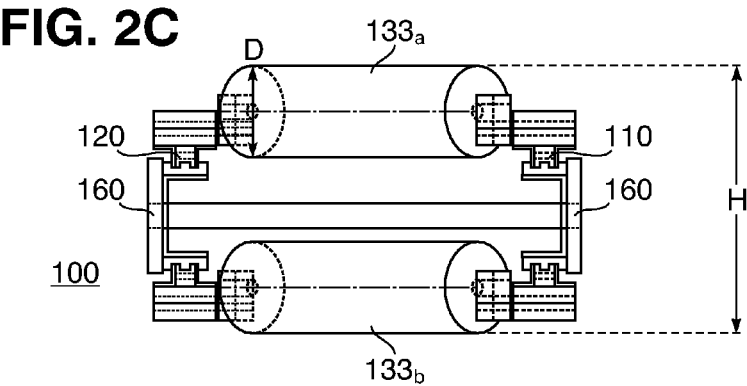
FIG. 2C is a sectional view of an omnidirectional track assembly through A-A of FIG. 2A, according to an embodiment of the invention.

FIG. 2C is a sectional view of a track assembly 100 for omnidirectional travel, through A-A of FIG. 2A, according to an embodiment of the invention. The section of FIG. 2C shows the low profile arrangement, with an upper roller $133_a$ and a lower roller $133_b$. Also illustrated is the first and second closed loop linking members 110 and 120, to which the rollers 133 are attached. The first and second closed loop linking members may be chains, tracks, or the like. FIG. 2C also shows low profile support 160 for supporting closed loop linking members 110 and 120 as the linking members traverse the respective closed loop paths 112 and 122. FIG. 2C further illustrates the track assembly having a height H, and the rollers 133 having a diameter D. Depending on the application, the track assembly 100 may have any desired height H and any desired diameter D that the structure allows. In one embodiment, the height H may be about 12 inches to about 30 inches, and the roller diameter D may be about 5 inches to about 13 inches. In one particular embodiment, the height H may be about 15 inches, and the diameter D of each roller may be about 6 inches.

Figure 3:
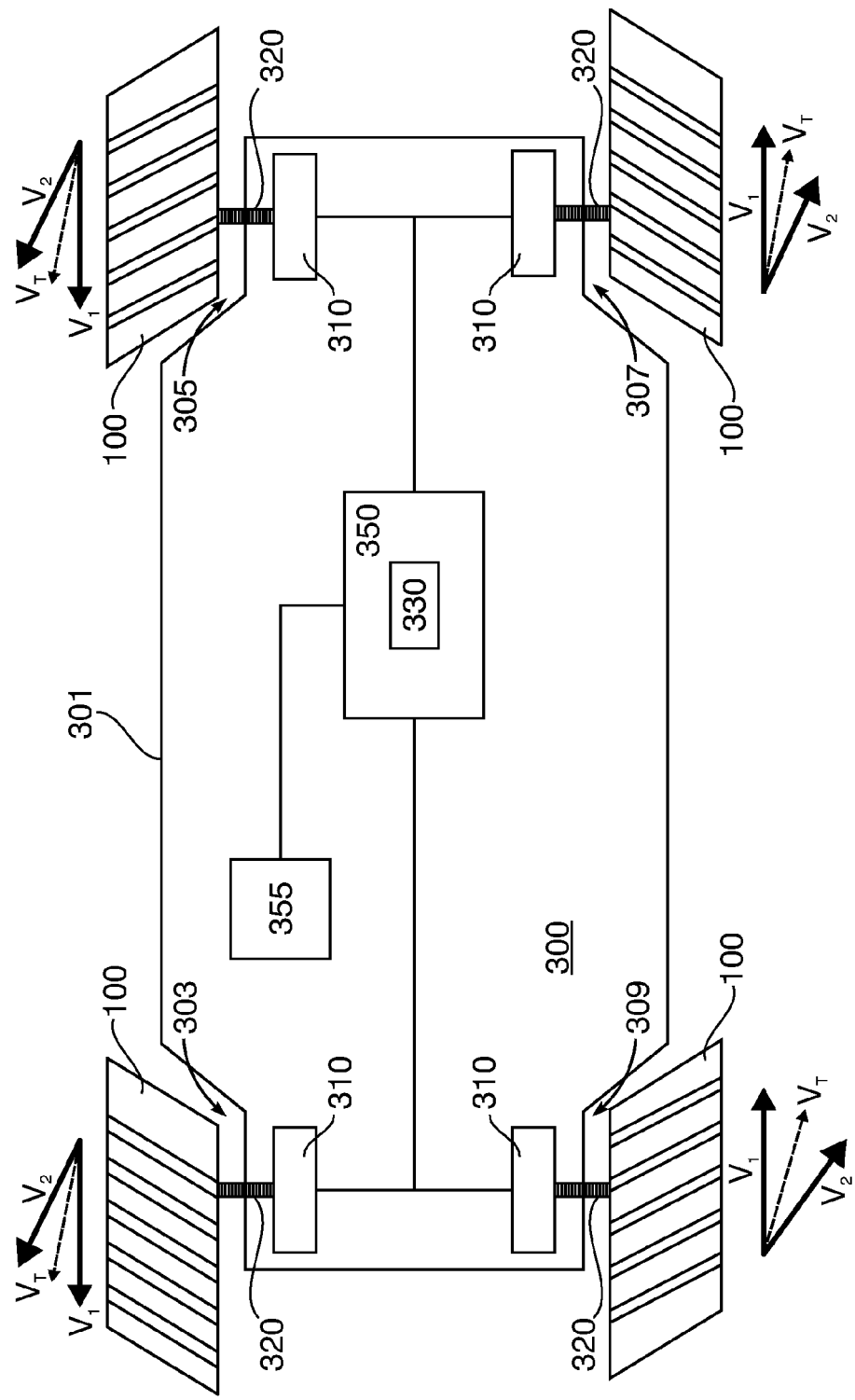
FIG. 3 is a schematic illustration of an omnidirectional vehicle, according to an embodiment of the invention.

FIG. 3 is a schematic illustration of a vehicle 300 for omnidirectional travel on a substantially planar surface, according to an embodiment of the invention. The vehicle 300 may be any desired type of vehicle, such as for example, vehicles that maneuver within confined spaces. As schematically shown, the vehicle 300 includes a chassis 301 to which four track assemblies 100 are attached at attachment locations 303, 305, 307, and 309. FIG. 3 also shows the chassis 301 having a transmission assembly for driving the track assemblies. The transmission assembly includes motors 310 and drive shafts 320. Each motor 310 and drive shaft 320 is connected to only one of the track assemblies 100 to more readily provide independent control of each track assembly 100. Each drive shaft 320 is coupled to the driving arrangement within a respective track assembly. Each motor 310 may be a two-way motor for reversibly driving the respective track assembly 100. As outlined above and as shown in FIG. 2A, each track assembly driving arrangement may include one or more sprockets. Known gearing arrangements may be used to couple each drive shaft 320 to a track driving arrangement. Although FIG. 3 shows each track assembly 100 driven by an independent motor 310, in an alternative arrangement, one motor and accompanying gearing may be used to power more than one of the track assemblies.

FIG. 3 further illustrates a power source 330 and a controller 350. The power source 330 supplies power to the transmission assembly, which includes the motors 310 and drive shafts 320. The power source 330 may also supply power to the controller 350. The power source 330 may be any known source, such as batteries, fuel cells, solar cells, combinations thereof, and the like. The vehicle 300 also includes a signal input receiver 355 that receives user inputs commands. The user input commands include commands by which a user controls the operation of the vehicle 300, such as for example, steering and velocity commands. Commands such as steering commands for example, may be entered by a user via a steering wheel or a joystick or the like, which may be located on the vehicle chassis 301, or may be remote to the chassis 301.

The controller 350 controls the operation of the vehicle 300 along a surface, such as 175, based on the signals received via the input receiver 355. As outlined above, according to an embodiment of the invention, each track assembly 100 is driven by an independent motor. Thus, the controller 350 controls each motor individually to facilitate the desired output velocity and direction.

When driven, each track assembly 100 has a final velocity $V_T$, which is the vector sum of velocities $V_1$ and $V_2$. $V_1$ represents the velocity vector derived from the propulsion along the looped path of the closed loop linking members when the closed loop linking members contact the surface. As outlined above, the closed loop linking members may be tracks, chains, or the like. $V_2$ represents the velocity vector derived from the rotation of the freely rotatably cylindrical rollers 133 as they contact the surface as the rollers 133 travel the respective looped path. The direction of the $V_2$ vector depends on the α angle, illustrated in FIGS. 2A and 2B. As stated above, angle α may be any angle between 0 degrees and 90 degrees, but may preferably be an angle of about 60 degrees to about 30 degrees. In one embodiment, angle α is about 45 degrees. It should be noted that because the motors may be reversible, the controller 350 may manipulate each track assembly in forward and reverse directions. Thus, each of the $V_1$ and the $V_2$ velocity vectors may be provided in forward and reverse directions. The resulting $V_T$ vector is the vector sum of the $V_1$ and the $V_2$ velocities. The motion of the vehicle 300 is determined by the combined $V_T$ values of each of the plurality of track assemblies.

Because the track assemblies are independently controlled, according to user input commands, one or more track assemblies 100 may be driven in a forward direction, while one or more track assembles are driven in a reverse direction. Additionally, one or more track assemblies 100 may not be driven, while others are driven, in order to facilitate the desired outcome. As a result, the vehicle 300 may be driven or rotated in any desired direction. It should be noted that although FIG. 3 shows the vehicle 300 having four track assemblies 100, the vehicle may contain only two, or only three track assemblies 100, the track assemblies 100 positioned to maintain a properly balanced vehicle. Additionally, more than the illustrated four track assemblies 100 may be used on a vehicle.

Figure 4:
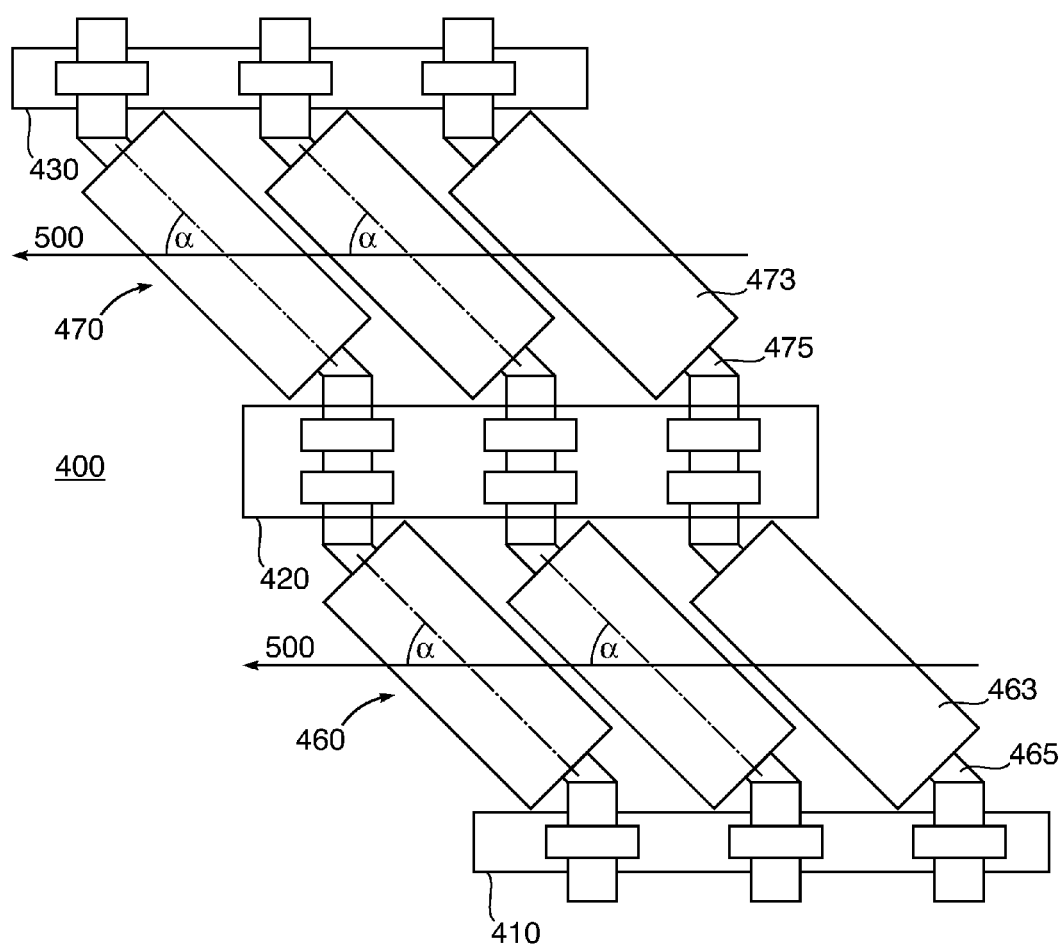
FIG. 4 is a schematic illustration of a track assembly for providing omnidirectional maneuverability, according to an embodiment of the invention.

FIG. 4 is a schematic illustration of a track assembly 400 for omnidirectional maneuverability, according to an embodiment of the invention. Track assembly 400 is similar to assembly 100 shown in FIG. 2A both having offset closed loop linking members, with rollers mounted therebetween. However as shown in FIG. 4, track assembly 400 includes three offset closed loop linking members 410, 420, and 430. A first roller arrangement 460 is mounted between closed loop linking members 410 and 420, and a second roller arrangement 470 is mounted between closed loop linking members 420 and 430. The roller arrangement 460 includes a plurality of parallel cylindrical rollers 463 mounted on roller axles 465, and roller arrangement 470 includes a plurality of parallel cylindrical rollers 473 mounted on roller axles 475. Similar to track assembly 100, in track assembly 400 the axles 465 and 475 of rollers 463 and 473 respectively, form an angle α with the main axis direction. According to an embodiment of the invention, angle α may be any angle between 0 degrees and 90 degrees, but may preferably be an angle of about 60 degrees to about 30 degrees. In one embodiment, angle α is about 45 degrees.

In operation, track assembly 400 operates in a similar manner to track assembly 100. Each closed loop linking member 410, 420, and 430 is driven by a driving arrangements, such as sprockets shown in FIG. 2A. The closed loop linking members 410, 420, and 430 are driven at substantially identical velocities, in closed loop paths, as illustrated in FIG. 2B. Thus, rollers 463 and 473 maintain their α angle orientation as they progress throughout their respective roller paths. Track assemblies 400 may be utilized in the omnidirectional vehicle 300, the control and overall arrangement of the vehicle 300 being as outlined above. It should be noted that the vehicle 300 may utilize only track assemblies 100, only track assemblies 400, or combinations including both track assemblies 100 and 400. For example, in a four-track arrangement as shown in FIG. 3 may include two track assemblies 100 and two track assemblies 400, each of the track assemblies 100 and 400 positioned at any track attachment location 303, 305, 307, and 309. It should be noted that track assemblies 400 may also be utilized in omnidirectional vehicles having only two track assemblies, only three track assemblies, or in vehicles having more than four track assemblies.

What has been described and illustrated herein are preferred embodiments of the invention along with some variations. The terms, descriptions and figures used herein are set forth by way of illustration only and are not meant as limitations. Those skilled in the art will recognize that many variations are possible within the spirit and scope of the invention, which is intended to be defined by the following claims and their equivalents, in which all terms are meant in their broadest reasonable sense unless otherwise indicated.

What is claimed is:

1. A track assembly for providing omnidirectional maneuverability in a vehicle along a substantially planar surface, the track assembly comprising:
    a driving arrangement;
    a first closed loop linking member connected to the driving arrangement, the driving arrangement driving the first closed loop linking member in a first closed loop path;
    a second closed loop linking member connected to the driving arrangement, the driving arrangement driving the second closed loop linking member in a second closed loop path, wherein the first loop path and the second loop path are substantially identical and substantially parallel, and wherein each of the first closed loop linking member and the second closed loop linking member travel the respective first and second looped paths at substantially identical velocities;
    a roller arrangement comprising:
        a plurality of rollers for contacting the substantially planar surface, wherein each of the plurality of rollers is a cylinder;
        a plurality of roller axles, each roller axle comprising a first end and a second end, wherein each roller axle rotatably supports one of the plurality of rollers, each roller being freely rotatable, and wherein each first end of each roller axle is connected to the first closed loop linking member, and each second end of each roller axle is connected to the second closed loop linking member, so each roller is supported substantially parallel to the substantially planar surface between the first closed loop linking member and the second closed loop linking member and each roller translates a looped roller path via the motion of the first closed loop linking member and the second closed loop linking member, wherein the plurality of rollers are supported on the plurality of axles so that each roller maintains an orientation substantially identical to an orientation of every other roller along the looped roller path, and wherein each of the first closed loop path and the second closed loop path comprises:
        an upper elongated path;
        a lower elongated path along which the plurality of rollers contact the substantially planar surface,
        a first end path; and
        a second end path, wherein the upper and the lower elongated paths are connected by the first and second end paths, and wherein the first closed loop path and closed first loop linking member, and the second closed loop path and second closed loop linking member, are offset from each other by a distance $X_0$ in a direction parallel to a main axis direction, so that each roller axle of the plurality of roller axles forms an angle α with the main axis direction of the track assembly, the main axis direction being substantially parallel to the direction of elongation of each closed loop linking member.

2. The track assembly of claim 1, wherein the roller arrangement further comprises:
    a plurality of first end joints; and
    a plurality of second end joints, wherein each first end of the plurality of roller axles is connected to the first closed loop linking member via a first end joint, and wherein each second end of the plurality of roller axles is connected to the second closed loop linking member via a second end joint, and wherein each roller of the roller arrangement has a substantially cylindrical shape, so that from end-to-end, the outer circumference of each roller contacts the substantially planar surface as each roller translates and rotates along the respective lower elongated path.

3. The track assembly of claim 2, wherein the lower elongated path has a length so that when the driving arrangement drives the first and second closed loop linking members, two or more rollers of the plurality of rollers are located in the lower elongated path, so that the two or more rollers contact the substantially planar surface simultaneously.

4. The track assembly of claim 3, wherein the omnidirectional track assembly has a height of about 15 inches, and wherein each roller of the roller assembly has a diameter of about 6 inches, and wherein the angle α is between about 60 degrees and about 30 degrees.

5. A vehicle for omnidirectional travel on a substantially planar surface, the vehicle comprising:
    a main vehicle chassis having a plurality of track attachment locations:
    two or more track assemblies, each of the two or more track assemblies are attached to one of the plurality of track attachment locations, each track assembly comprising:
    a driving arrangement;

a first closed loop linking member connected to the driving arrangement, the driving arrangement driving the first closed loop linking member in a first closed loop path;

a second closed loop linking member connected to the driving arrangement, the driving arrangement driving the second closed loop linking member in a second closed loop path, wherein the first loop path and the second loop path are substantially identical and substantially parallel, and wherein each of the first closed loop linking member and the second closed loop linking member travel the respective first and second looped paths at substantially identical velocities;

a roller arrangement comprising:

a plurality of rollers for contacting the substantially planar surface, wherein each of the plurality of rollers is a cylinder; and a plurality of roller axles, each roller axle comprising a first end and a second end, wherein each roller axle rotatably supports one of the plurality of rollers, each roller being freely rotatable, and wherein each first end of each roller axle is connected to the first closed loop linking member, and each second end of each roller axle is connected to the second closed loop linking member, so each roller is supported substantially parallel to the substantially planar surface between the first closed loop linking member and the second closed loop linking member and each roller translates a looped roller path via the motion of the first closed loop linking member and the second closed loop linking member, wherein the plurality of rollers are supported on the plurality of axles so that each roller maintains an orientation substantially identical to an orientation of every other roller along the looped roller path, and wherein in each track assembly each of the first closed loop path, second closed loop path, and looped roller path comprises:

an upper elongated path;

a lower elongated path along which the plurality of rollers contact the substantially planar surface, a first end path; and a second end path, wherein the upper and the lower elongated paths are connected by the first and second end paths; and wherein the first closed loop path and first closed loop linking member, and the second closed loop path and second closed loop linking member, are offset from each other by a distance $X_0$ in a direction parallel to a main axis direction, so that each roller axle of the plurality of roller axles forms an angle $\alpha$ with the main axis direction of the track assembly, the main axis direction being substantially parallel to the direction of elongation of each closed loop linking member.

6. The vehicle for omnidirectional travel of claim 5, further comprising:

at least one power source on the main chassis;

a transmission assembly on the main chassis, the transmission assembly attached to the at least one power source, the transmission assembly connected to each driving arrangement of each track assembly; and a controller on the main chassis, the controller electronically connected to the at least one power source, the transmission, and the two or more omnidirectional track assemblies, for controlling the operation of the vehicle.

7. The vehicle for omnidirectional travel of claim 6, wherein in each track assembly the roller arrangement further comprises:

a plurality of first end joints; and a plurality of second end joints, wherein each first end of the plurality of roller axles is connected to the first closed loop linking member via a first end joint, and wherein each second end of the plurality of roller axles is connected to the second closed loop linking member via a second end joint, and wherein each roller of the roller arrangement has a substantially cylindrical shape, so that from end-to-end the outer circumference of each roller contacts the substantially planar surface as each roller translates and rotates along the respective lower elongated path.

8. The vehicle for omnidirectional travel of claim 7, wherein in each track assembly the lower elongated path has a length so that when the driving arrangement drives the first and second closed loop linking members, two or more rollers of the plurality of rollers are located in the lower elongated path, so that the two or more rollers contact the substantially planar surface simultaneously.

9. The vehicle for omnidirectional travel of claim 7, wherein the two or more track assemblies comprises four track assemblies.

10. A vehicle for omnidirectional travel on a substantially planar surface, the vehicle comprising:

a main vehicle chassis having a plurality of track attachment locations:

two or more track assemblies, each of the two or more track assemblies are attached to one of the plurality of track attachment locations, each track assembly comprising:

a driving arrangement;

two or more closed loop linking members, each of the two or more closed loop linking members connected to the driving arrangement, the driving arrangement driving each closed loop linking member in a closed loop path, wherein each closed loop path is substantially identical and substantially parallel to the other, and wherein each closed loop linking member travels the respective closed loop path at substantially identical velocities;

one or more roller arrangements, each of the one or more roller arrangements comprising:

a plurality of rollers for contacting the substantially planar surface, wherein each of the plurality of rollers is a cylinder; and a plurality of roller axles, each roller axle comprising a first end and a second end, wherein each roller axle rotatably supports one of the plurality of rollers, and wherein each first end of each roller axle is connected to a closed loop linking member and each second end of each roller axle is connected to another closed loop linking member so each roller translates a looped roller path via the motion of the closed loop linking members to which the first and second axle ends are attached, wherein the plurality of rollers are supported on the plurality of axles so that each roller maintains an orientation substantially identical to an orientation of every other roller along the looped roller path, and wherein in each track assembly each of the closed loop paths comprises:

an upper elongated path;

a lower elongated path along which the plurality of rollers contact the substantially planar surface, a first end path; and a second end path, wherein the upper and the lower elongated paths are connected by the first and second end paths, and wherein in each track assembly the two or more closed loop linking members comprise:

a first closed loop linking member; and a second closed loop linking member, and wherein the one or more roller arrangements comprise a first roller arrangement, wherein in said first roller arrangement the first end of each roller axle is connected to the first closed loop linking member and the second end of each roller axle is connected to the second closed loop linking member, forming a first row of rollers between the first closed loop linking member and the second closed loop linking member, wherein the first closed loop linking member and respective closed loop path, and the second closed loop linking member and respective closed loop path, are offset from each other by a distance $X_0$ in a direction parallel to a main axis direction, so that each roller axle of the at least a portion of the plurality of roller axles forms a first row angle α with a main axis direction of the track assembly, the main axis direction being substantially to the direction of elongation of each closed loop linking member.

11. The vehicle for omnidirectional travel of claim 10 further comprising:

at least one power source on the main chassis;

a transmission assembly on the main chassis, the transmission assembly attached to the at least one power source, the transmission assembly connected to each driving arrangement of each track assembly; and a controller on the main chassis, the controller electronically connected to the at least one power source, the transmission, and the two or more omnidirectional track assemblies, for controlling the operation of the vehicle.

12. The vehicle for omnidirectional travel of claim 11, wherein in each track assembly the two or more closed loop linking members further comprise:

a third closed loop linking member, and wherein the one or more roller arrangements further comprise a second roller arrangement, wherein in each second roller arrangement the first end of each roller axle is connected to the second closed loop linking member and the second end of each roller axle is connected to the third closed loop linking member, forming a second row of rollers between the second closed loop linking member and the third closed loop linking member, the second row of rollers adjacent to the first row of rollers, wherein the second closed loop linking member and respective closed loop path and the third closed loop linking member and respective closed loop path are offset from each other by a distance $X_0$ in a direction parallel to a main axis direction, so that each roller axle of the remaining portion of the plurality of roller axles forms a second row angle α with a main axis direction of the track assembly, the main axis direction being substantially parallel to the direction of elongation of each closed loop linking member.

13. The vehicle for omnidirectional travel of claim 12, wherein the transmission assembly on the main chassis comprises:

a plurality of reversible motors, each of the reversible motors connected to one of the track assemblies, for independently driving each track assembly.

14. The vehicle for omnidirectional travel of claim 13, wherein each roller of the one or more roller arrangements has a substantially cylindrical shape, so that from end to end the outer circumference of each roller contacts the substantially planar surface as each roller translates and rotates along the respective lower elongated path.

15. The vehicle for omnidirectional travel of claim 14, wherein the two or more track assemblies comprise four track assemblies.

* * * * *